Oct. 12, 1948.     A. R. HAYES     2,450,958
ADJUSTABLE FENDER SKIRT BRACE
Filed March 18, 1946
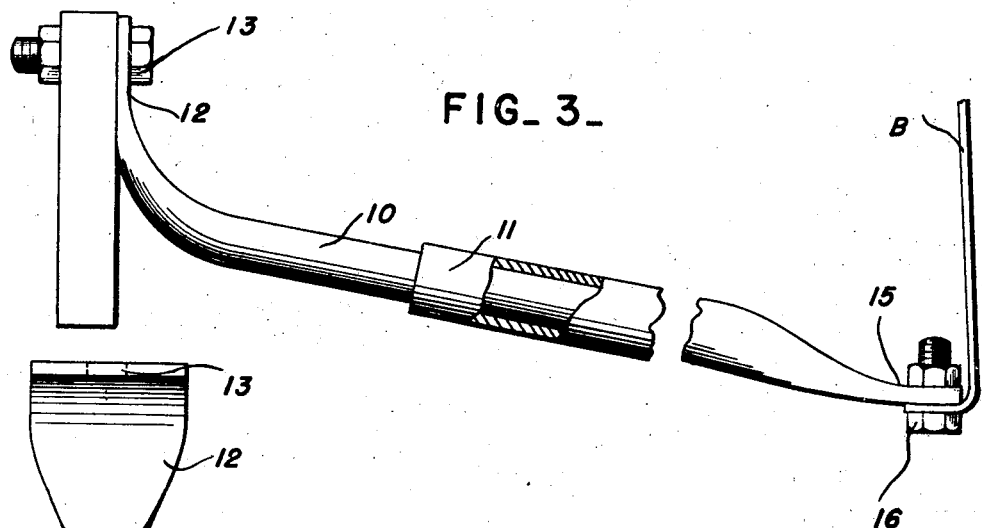
FIG_3_
FIG_2_
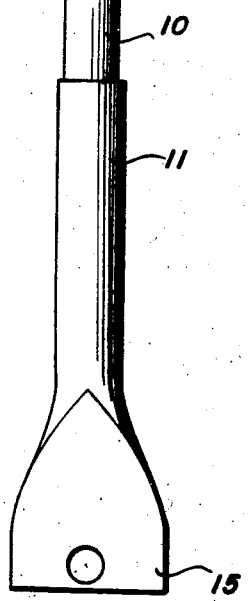
FIG_1_
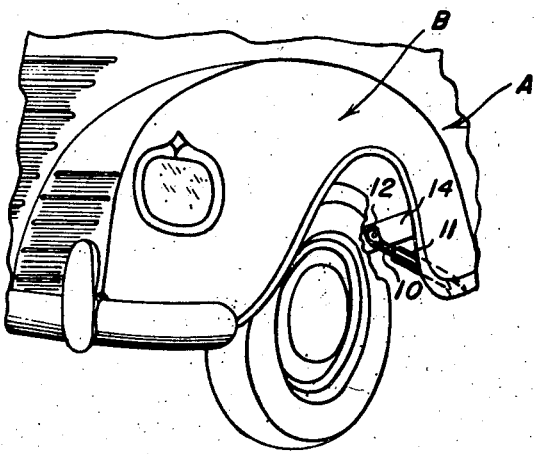
INVENTOR
ARTHUR R. HAYES
BY *Victor J. Evans & Co.*
ATTORNEYS Patented Oct. 12, 1948

2,450,958

UNITED STATES PATENT OFFICE 2,450,958

ADJUSTABLE FENDER SKIRT BRACE

Arthur R. Hayes, Cambridge, Ohio

Application March 18, 1946, Serial No. 655,138

1 Claim. (Cl. 280—152)

The invention relates to an adjustable brace, and more especially to an automobile skirted fender brace.

The primary object of the invention is the provision of a brace of this character, wherein it has application to the chassis frame of a motor vehicle or the like and the skirted fender thereof, so that the skirt of such fender will not cave in or distend from normalcy or vibrate causing a rattle, thus the said fender being held in a rigid fixed position.

Another object of the invention is the provision of a brace of this character, wherein a fender on an automobile will be held firm and the brace is susceptible of adjustment so that it will fit different sizes of fenders and can be properly set at the skirt thereof, to reinforce the latter and maintain it firm and secure.

A further object of the invention is the provision of a brace of this character, wherein its construction is novel and for a specific purpose, and is unique in the arrangement thereof, it being possessed of few parts and adjustable in kind.

A still further object of the invention is the provision of a brace of this character, which is simple in construction, thoroughly reliable and efficient in purpose, strong, durable, readily and easily applied, applicable to front and rear fenders of motor vehicles, and inexpensive to manufacture and install.

With these and other objects in view the invention consists in the features of construction, combination and arrangement of parts as will be hereinafter more fully described, illustrated in the accompanying drawing, which discloses the preferred embodiment of the invention, and pointed out in the claim hereunto appended.

In the accompanying drawing:

Figure 1 is a fragmentary perspective view of a motor vehicle with the brace constructed in accordance with the invention applied to its fender.

Figure 2 is an elevation of the brace detached.

Figure 3 is a side view, partly broken away, showing the brace on an enlarged scale in applied position.

Similar reference characters indicate corresponding parts throughout the several views in the drawing.

Referring to the drawing in detail, A designates generally a portion of a motor vehicle, of any standard construction, and B a skirted fender thereof, which latter is of usual construction, in this instance it being the front fender, yet the illustration could be a rear fender.

The brace constituting the present invention, comprises a pair of tubiform rodlike sections 10 and 11 respectively, which may be of varying lengths according to the job to be performed thereby. These sections 10 and 11 for a major portion of their length are straight and the section 10 adjustably telescopes into the section 11, as best seen in Figure 3 of the drawing, for bridging position within the fender B, as illustrated in Figure 1.

The section 10 is provided with a flattened terminal ear 12 which is bent at an angle to such section and is formed with a clearance for a nut carrying bolt or other fastener 13, so that this ear 12 can be secured to the chassis frame, only a portion thereof is indicated at 14 of the motor vehicle A.

The section 11 is formed with a flattened terminal ear 15 which is disposed at a proper setting to the skirted area of the fender B and has a clearance for a bolt or other like fastener 16 for securing such section 11 to the said fender, as may be seen in Figures 1 and 3 of the drawing.

The brace including the sections secured as stated will hold the fender firm and reinforces the skirted area thereof, the brace after adjustment of the sections for spanning or bridging disposition within the fender being rendered rigid by welding or otherwise the sections where the same telescope each other, so that these sections cannot become displaced relative to each other after adjustment.

Any other manner of securing the sections of the brace at the two points thereof with the chassis frame and the fender can be resorted to, the essence of the invention being in the extensibility of the brace for the specific use thereof.

What is claimed is:

An adjustable brace adapted to support the skirted fender of an automobile from the chassis thereof, said adjustable brace being secured at one end to said skirted fender, and at the other end to the chassis of said motor vehicle, and comprising a pair of tubiform rod-like telescopically interfitted sections, which sections when adjusted in place are adapted to be welded together to provide a strong skirted fender supporting structure, the free end of one of said tubiform sections being curved and flattened, and provided at its flattened portion with a flattened terminal ear, said ear being secured to said automobile chassis by a bolt and nut, and the free end of the other of said tubiform rod-like sections being provided with a flattened terminal ear so disposed as to permit securement of said terminal flattened ear to said skirted fender by means of a bolt and nut.

ARTHUR R. HAYES.

REFERENCES CITED

The following references are of record in the file of this patent:

UNITED STATES PATENTS

| Number | Name | Date |
|---|---|---|
| 509,781 | Weiss | Nov. 28, 1893 |
| 937,376 | Masden | Oct. 19, 1909 |
| 991,913 | Von Engeln | May 9, 1911 |
| 1,381,659 | Rapp et al. | June 14, 1921 |

FOREIGN PATENTS

| Number | Country | Date |
|---|---|---|
| 149,689 | Great Britain | Oct. 27, 1921 |